(12) United States Patent
Jeong et al.

(10) Patent No.: US 11,721,486 B2
(45) Date of Patent: Aug. 8, 2023

(54) MULTILAYER CERAMIC ELECTRONIC COMPONENT HAVING SPECIFIED THICKNESS RATIO FOR DIFFERENT PORTIONS OF EXTERNAL ELECTRODE

(71) Applicant: SAMSUNG ELECTRO-MECHANICS CO., LTD., Suwon-si (KR)

(72) Inventors: Eun Hee Jeong, Suwon-si (KR); Min Hyang Kim, Suwon-si (KR); Dong Yeong Kim, Suwon-si (KR); Chae Min Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 147 days.

(21) Appl. No.: 16/838,592

(22) Filed: Apr. 2, 2020

(65) Prior Publication Data

US 2021/0090807 A1 Mar. 25, 2021

(30) Foreign Application Priority Data

Sep. 20, 2019 (KR) .................. 10-2019-0116144

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1227* (2013.01); *H01G 4/248* (2013.01)

(58) Field of Classification Search
CPC ........... H01G 4/30; H01G 4/005; H01G 4/14; H01G 4/224; H01G 4/248; H01G 4/252; H01G 4/012
See application file for complete search history.

(56) References Cited

U.S. PATENT DOCUMENTS 10,026,556 B2 7/2018 Ando et al.
10,354,802 B1 7/2019 Bae et al.
(Continued)

FOREIGN PATENT DOCUMENTS

CN 104465087 A 3/2015
CN 104576048 A 4/2015
(Continued)

OTHER PUBLICATIONS

Passive Blog Components, "MLCC Case Sizes Standards Explained", 2021, https://passive-components.eu/mlcc-case-sizes-standards-explained/ (Year: 2021).*
(Continued)

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A multilayer ceramic electronic component includes a ceramic body including a capacitance formation portion including a dielectric layer and first and second internal electrodes with the dielectric layer interposed therebetween; and first and second external electrodes disposed on the first and second surfaces of the ceramic body, respectively, and including first and second base electrodes connected to the first and second internal electrodes and first and second conductive layers disposed to cover the first and second base electrodes. When a thickness of the first and second conductive layers in a central portion of the first and second surfaces of the ceramic body is 'a', and a thickness of the first and second conductive layers at an end of the capacitance formation portion is 'b', 'b/a' is 0.07 or more.

20 Claims, 4 Drawing Sheets

(51) Int. Cl.
 *H01G 4/12* (2006.01)
 *H01G 4/248* (2006.01)

(56) References Cited

U.S. PATENT DOCUMENTS

| | | | |
|---|---|---|---|
| 10,373,759 B1 | 8/2019 | Choi et al. | |
| 10,622,151 B2 | 4/2020 | Kobayashi et al. | |
| 2012/0298407 A1* | 11/2012 | Ahn | H01G 4/12 |
| | | | 174/260 |
| 2013/0094118 A1* | 4/2013 | Kim | H01G 4/30 |
| | | | 361/301.4 |
| 2014/0192453 A1* | 7/2014 | Hong | H01G 4/008 |
| | | | 361/301.4 |
| 2015/0075853 A1 | 3/2015 | Lee et al. | |
| 2015/0096795 A1* | 4/2015 | Hong | H01G 2/065 |
| | | | 361/301.4 |
| 2015/0114700 A1 | 4/2015 | Park et al. | |
| 2015/0243439 A1 | 8/2015 | Kwag | |
| 2016/0027583 A1 | 1/2016 | Ahn et al. | |
| 2017/0098506 A1 | 4/2017 | Ando et al. | |
| 2017/0271083 A1* | 9/2017 | Makino | H01G 4/008 |
| 2017/0301468 A1* | 10/2017 | Kim | H01G 4/232 |
| 2018/0204678 A1* | 7/2018 | Yamaguchi | H01G 4/1227 |
| 2019/0131076 A1* | 5/2019 | Fukumura | H01G 4/2325 |
| 2019/0148070 A1* | 5/2019 | Kobayashi | H01G 4/232 |
| | | | 174/260 |
| 2019/0362895 A1* | 11/2019 | Kobayashi | H01G 4/30 |
| 2021/0050152 A1* | 2/2021 | Zenzai | B22F 7/002 |
| 2021/0057154 A1* | 2/2021 | Zenzai | H01G 4/232 |
| 2021/0057155 A1* | 2/2021 | Zenzai | H01G 4/008 |
| 2021/0057161 A1* | 2/2021 | Zenzai | H01G 4/232 |

FOREIGN PATENT DOCUMENTS

| | | | | |
|---|---|---|---|---|
| CN | 104867673 A | | 8/2015 | |
| CN | 104979096 A | | 10/2015 | |
| CN | 106971846 A | | 7/2017 | |
| CN | 109786108 A | | 5/2019 | |
| CN | 110120299 A | | 8/2019 | |
| CN | 110211806 A | | 9/2019 | |
| JP | 2009200421 A | * | 9/2009 | H01G 4/2325 |
| JP | 4946941 B2 | * | 6/2012 | |
| JP | 2015-39037 A | | 2/2015 | |
| JP | 2017-73434 A | | 4/2017 | |
| KR | 10-2016-0012830 A | | 2/2016 | |

OTHER PUBLICATIONS

Office Action issued in corresponding Chinese Patent Application No. 202010704599.2 dated Oct. 28, 2022, with English translation.
Chinese Office Action dated Jul. 21, 2022, issued in corresponding Chinese Patent Application No. 202010704599.2.

* cited by examiner

MULTILAYER CERAMIC ELECTRONIC COMPONENT HAVING SPECIFIED THICKNESS RATIO FOR DIFFERENT PORTIONS OF EXTERNAL ELECTRODE

CROSS-REFERENCE TO RELATED APPLICATION

The present application claims the benefit of priority to Korean Patent Application No. 10-2019-0116144 filed on Sep. 20, 2019 in the Korean Intellectual Property Office, the disclosure of which is incorporated herein by reference in its entirety.

TECHNICAL FIELD

The present disclosure relates to a multilayer ceramic electronic component.

BACKGROUND

In recent years, with the trend for miniaturization of electronic products, multilayer ceramic electronic components are also required to be miniaturized while having high capacity. In accordance with the demand for miniaturization and high capacity in multilayer ceramic electronic components, external electrodes of the multilayer ceramic electronic components are also becoming thinner.

Conventionally, glass, a base resin, an organic solvent, and the like have been mixed with a conductive metal to prepare an external electrode paste, and a dipping method sintering a ceramic body after applying the external electrode paste to both end surfaces of the ceramic body has been used to form the external electrode.

However, when the external electrode is formed by the dipping method, an external electrode of an outermost region may be thinly formed, thereby deteriorating corner coverage performance. In addition, it is easy to permeate foreign materials such as moisture, or the like, which is a major cause of the deterioration of product quality due to deterioration of moisture resistance.

SUMMARY

An aspect of the present disclosure is to provide a multilayer ceramic electronic component that may improve moisture resistance by blocking a moisture permeation path by improving corner coverage performance of an external electrode.

According to an aspect of the present disclosure, a multilayer ceramic electronic component includes a ceramic body including a capacitance formation portion including a dielectric layer and first and second internal electrodes stacked in a stacking direction with the dielectric layer interposed therebetween, and having a first surface and a second surface opposing to each other in a first direction, a third surface and a fourth surface opposing to each other in a second direction, and a fifth surface and a sixth surface opposing to each other in a third direction which is the stacking direction; and first and second external electrodes disposed on the first and second surfaces of the ceramic body, respectively, and including first and second base electrodes connected to the first and second internal electrodes, respectively, and first and second conductive layers disposed to cover the first and second base electrodes, respectively. A ratio 'b/a' is 0.07 or more, where a thickness of the first and second conductive layers in a central portion of the first and second surfaces of the ceramic body is 'a', and a thickness of the first and second conductive layers at an end of the capacitance formation portion is 'b'.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a first direction, an L direction or a length direction, a Y direction may be defined as a second direction, a W direction or a width direction, and a Z direction may be defined as a third direction, a T direction and a thickness direction.

Hereinafter, a multilayer ceramic electronic component according to an embodiment of the present disclosure will be described in detail with reference to FIGS. 1 to 5.

Referring to FIGS. 1 to 5, a multilayer ceramic electronic component may include a ceramic body 110 including a capacitance formation portion including a dielectric layer 111 and first and second internal electrodes 121 and 122 disposed to be stacked in a third direction (the Z direction) with the dielectric layer 111 interposed therebetween, and including first and second surfaces S1 and S2 opposed in a first direction (the X direction), third and fourth surfaces S3 and S4 opposed in a second direction (the Y direction), and fifth and sixth surfaces S5 and S6 opposed in a third direction (the Z direction); and first and second external electrodes 131 and 132 disposed on the first surface S1 and the second surface S2 of the ceramic body 110, respectively, and including first and second base electrodes 131a and 132a connected to the first and second internal electrodes 121 and 122 and first and second conductive layers 131b and 132b disposed to cover the first and second base electrode 131a and 132a.

In this case, when a thickness of the first and second conductive layers 131b and 132b in a central portion of the first surface S1 and the second surface S2 of the ceramic body 110 is 'a', and a thickness of the first and second conductive layers 131b and 132b at an end of the capacitance formation portion is 'b', 'b/a' may exceed 0.07. The thickness 'a' of the first and second conductive layers 131b and 132b may mean a length of the first and second conductive layers 131b and 132b in a first direction (the X direction) in a central portion of the first surface S1 and the second surface S2 of the ceramic body 110. In addition, the thickness 'b' of the first and second conductive layers 131b and 132b may mean a length of the first and second conductive layers 131b and 132b in a first direction (the X direction) at an end of the capacitance formation portion of the first surface S1 and the second surface S2 of the ceramic body 110.

By making the ratio 'b/a' exceed 0.07, corner coverage performance of external electrodes may be improved.

In an embodiment of the present disclosure, a ceramic body 110 may include a capacitance formation portion including a dielectric layer 111 and first and second internal electrodes 121 and 122, a margin portion 112 disposed on both surfaces (e.g., the third and fourth surfaces S3 and S4) of the capacitance formation portion in a second direction (the Y direction), and a cover portion 113 disposed on both surfaces (e.g., the fifth and sixth surfaces S5 and S6) of the capacitance formation portion in a third direction (the Z direction).

Although a specific shape of the ceramic body 110 is not particularly limited, as shown, the ceramic body 110 may be formed in a hexahedral shape or a shape similar thereto. Due to shrinkage of ceramic powder contained in the ceramic body 110 during a firing process, the ceramic body 110 may have a substantially hexahedral shape, although not a hexahedral shape having perfect straight lines. The ceramic body 110 may have first and second surfaces S1 and S2 opposing each other in a longitudinal direction (the X direction), third and fourth surfaces S3 and S4 connected to the first and second surfaces S1 and S2 and opposing each other in a width direction (the Y direction), and fifth and sixth surfaces S5 and S6 connected to the first and second surfaces S1 and S2, connected to the third and fourth surfaces S3 and S4 and opposing each other in a thickness direction (the Z direction).

The ceramic body 110 may be formed by alternately stacking a ceramic green sheet on which a first internal electrode 121 is printed and a ceramic green sheet on which a second internal electrode 122 is printed in a thickness direction (the Z direction).

The capacitance formation portion may be formed by alternately stacking a dielectric layer 111 and internal electrodes 121 and 122 in a third direction (the Z direction). A plurality of dielectric layers 111 forming the capacitance formation portion may be in a sintered state, and boundaries between adjacent dielectric layers 111 may be integrated such that they may be difficult to confirm without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used.

A variety of ceramic additives, organic solvents, plasticizers, binders, dispersants, and the like may be added to powder particles such as barium titanate ($BaTiO_3$), and the like, depending on the purpose of the present disclosure.

For example, the dielectric layer 111 may be formed by applying and drying a slurry formed by including powder such as barium titanate ($BaTiO_3$) on a carrier film to prepare a plurality of ceramic sheets. The ceramic sheet may be formed by mixing ceramic powder, a binder, and a solvent to prepare a slurry, and manufacturing the slurry into a sheet having a thickness of several μms by a doctor blade method, but is not limited thereto.

A multilayer ceramic electronic component of the present disclosure may be disposed such that a plurality of internal electrodes 121 and 122 are disposed to oppose each other with the dielectric layer 111 interposed therebetween. The internal electrodes 121 and 122 may include first and second internal electrodes 121 and 122 that are alternately disposed to oppose each other with the dielectric layer 111 interposed therebetween.

The first internal electrode 121 may be exposed to one surface S1 of the ceramic body 110 in the first direction (the X direction), and a portion exposed to the one surface S1 in the first direction (the X direction) may be connected to a first external electrode 131. The second internal electrode 122 may be exposed to the other surface S2 of the ceramic body 110 in the first direction (the X direction), and a portion exposed to the other surface S2 of the first direction (the X direction) may be connected to a second external electrode 132. The first and second internal electrodes 121 and 122 may be electrically separated from each other by the dielectric layer 111 disposed in a middle.

A material for forming the first and second internal electrodes 121 and 122 is not particularly limited, and for example, the first and second internal electrodes 121 and 122 may be formed by using a conductive paste including one or more materials of silver (Ag), palladium (Pd), gold (Au), platinum (Pt), nickel (Ni), copper (Cu), tin (Sn), tungsten (W), titanium (Ti), and alloys thereof. As a printing method of the conductive paste, a screen-printing method, a gravure printing method, or the like, may be used, but the present disclosure is not limited thereto.

In a multilayer ceramic electronic component according to the present disclosure, a margin portion 112 may be disposed on both surfaces of the capacitance formation portion in a second direction (the Y direction). The margin portion 112 may be disposed on both surfaces of the capacitance formation portion in the second direction (the Y direction) perpendicular to the first and third directions (X and Z directions), respectively. The margin portion 112 may serve to prevent damages to the internal electrodes due to physical or chemical stresses.

The margin portion 112 may be made of an insulating material, and may be made of a ceramic material such as barium titanate, or the like. In this case, the margin portion 112 may include the same ceramic material as that included in the dielectric layer 111, or may be made of the same material as the dielectric layer 111. A method for forming the margin portion is not particularly limited. For example, an area of the dielectric layer included in the capacitance formation portion may be formed to be greater than an area of the internal electrode, to form a margin area may be formed in a remaining circumferential portion except for the portion of the internal electrode connected to the external electrode, or it may be formed by applying a slurry containing ceramic or attaching a dielectric sheet to both surfaces of the capacitance formation portion in a second direction (the Y direction).

The multilayer ceramic electronic component according to the present disclosure may include a cover portion 113. The cover portion 113 may be disposed at an outermost portion of the first and second internal electrodes 121 and 122. The cover portion 113 may be disposed below the internal electrode of the lowermost portion of the body 110 and above the internal electrode of the uppermost portion. In this case, the cover portion 113 may be formed of the same composition as the dielectric layer 111, and may be formed by stacking at least one or more dielectric layers that do not include an internal electrode on an upper portion of the uppermost internal electrode and on a lower portion of the lowermost internal electrode, respectively. The cover portion 113 may basically serve to prevent damage to the internal electrode due to physical or chemical stresses.

In the multilayer ceramic electronic component 100 according to the present disclosure, a first external electrode 131 and a second external electrode 132 may be disposed on both surfaces of the ceramic body in a first direction (the X direction). The first external electrode 131 may be connected to the first internal electrode 121, and the second external electrode 132 may be connected to the second internal electrode 122.

The first and second external electrodes 131 and 132 may include first and second base electrodes 131a and 132a disposed on both surfaces of the ceramic body 110 in a first direction (the X direction) and connected to the first and second internal electrodes 121 and 122, respectively, and first and second conductive layers 131b and 132b disposed to cover the first and second base electrodes 131a and 132a, respectively.

Figure 1:
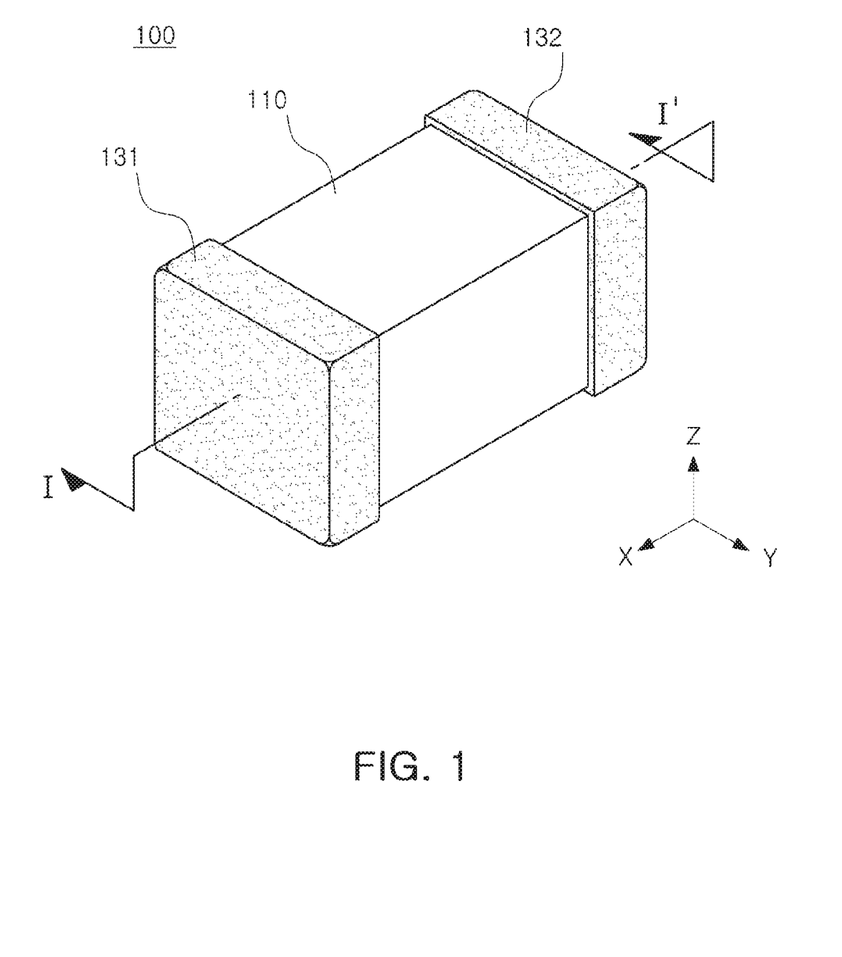
FIG. 1 is a schematic perspective view illustrating a multilayer ceramic electronic component according to an embodiment of the present disclosure.
Figure 2:
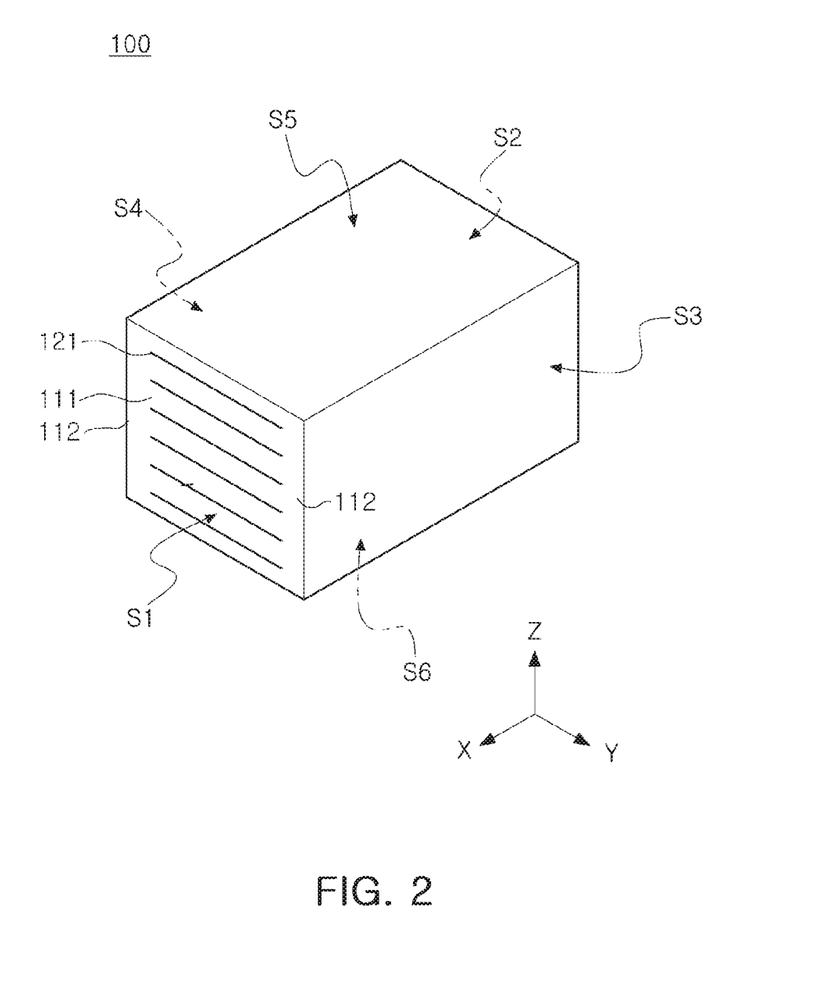
FIG. 2 is a schematic perspective view illustrating a ceramic body of a multilayer ceramic electronic component according to an embodiment of the present disclosure.
Figure 3:
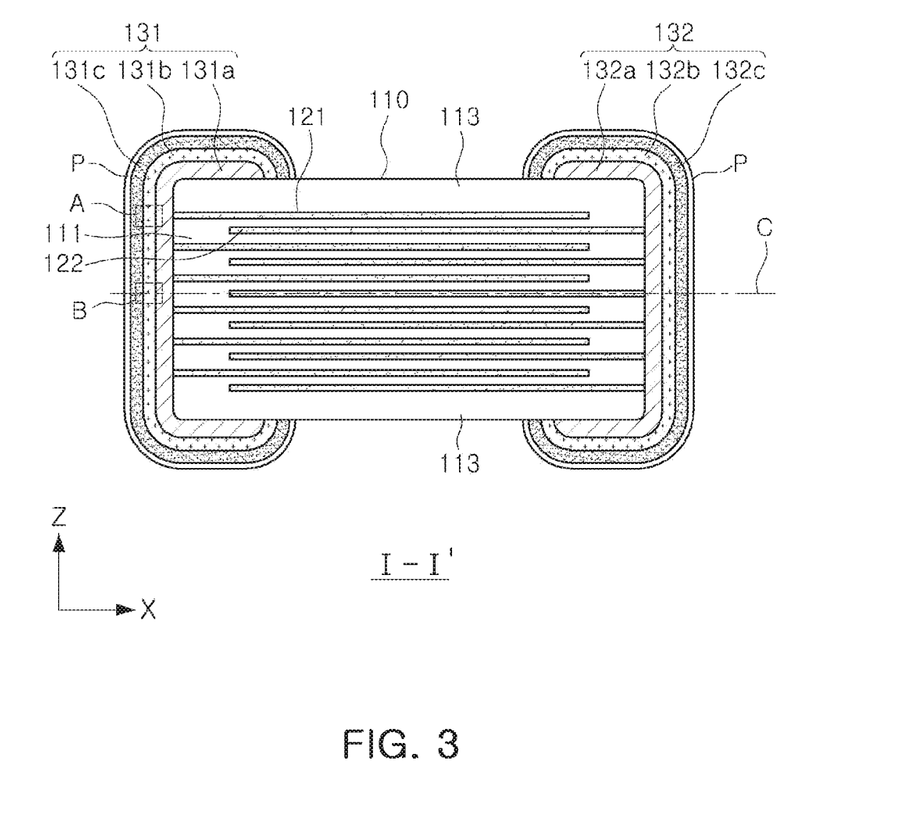
FIG. 3 is a cross-sectional view taken along line I-I' of FIG. 1.

In an example of the present disclosure, the first external electrode 131 may be disposed to be extended onto the third to sixth surfaces S3 to S6 in contact with the first surface S1 of the ceramic body 110, and the second external electrode 132 may be disposed to extend to the third to sixth surfaces S3 to S6 in contact with the second surface S2 of the ceramic body 110. Referring to FIGS. 1 and 3, the first and second external electrodes 131 and 132 may be disposed to be extended onto the first surface or the second surface S1 or S2 of the ceramic body 110 and on the third to sixth surfaces (S3 to S6) surfaces, respectively, in contact with the first surface or the second surface S1 or S2 of the ceramic body 110. As described above, the first and second external electrodes 131 and 132 may be disposed to cover each corner of the ceramic body 110, thereby suppressing external moisture permeation.

In an embodiment of the present disclosure, a first base electrode 131a and a second base electrode 132a may contain copper (Cu). The first base electrode 131a and the second base electrode 132a may contain a majority of copper, but are not limited thereto. For example, the first base electrode 131a and the second base electrode 132a may be formed using a conductive paste including one or more materials of nickel (Ni), tin (Sn), palladium (Pd), platinum (Pt), gold (Au), silver (Ag), tungsten (W), titanium (Ti), lead (Pb), and alloys thereof, and glass.

A method of forming the first base electrode 131a and the second base electrode 132a does not need to be particularly limited, and the first base electrode 131a and the second base electrode 132a may be formed by dipping a ceramic body in a conductive paste containing a conductive metal and glass or by printing the conductive paste on a surface of the ceramic body by using a screen printing method, a gravure printing method, or the like. In addition, the conductive paste may be formed by applying the conductive paste on the surface of the ceramic body or transferring a dry film formed by drying the conductive paste onto the ceramic body, but is not limited thereto. The first base electrode 131a and the second base electrode 132a may be formed by using the above-described conductive paste, thereby maintaining sufficient conductivity, and increasing density of the external electrode due to added glass, thereby increasing a plating solution, permeation of a plating solution and/or external moisture may be effectively suppressed.

A glass component included in the first base electrode 131a and the second base electrode 132a may be a composition in which oxides are mixed, but is not particularly limited, but may be one or more selected from a group consisting of a silicon oxide, a boron oxide, an aluminum oxide, a transition metal oxide, an alkaline metal oxide, and an alkaline earth metal oxide. The transition metal may be one or more selected from a group consisting of zinc (Zn), titanium (Ti), copper (Cu), vanadium (V), manganese (Mn), iron (Fe) and nickel (Ni), the alkaline metal may be one or more selected from a group consisting of lithium (Li), sodium (Na), and potassium (K), and the alkaline earth metal may be one or more selected from a group consisting of magnesium (Mg), calcium (Ca), strontium (Sr), and barium (Ba).

In an example, the thickness of the first base electrode 131a and the second base electrode 132a may be in a range of 3 μm to 13 μm. A thickness of the first base electrode 131a and the second base electrode 132a may mean a length of the first base electrode 131a and the second base electrode 132a in a first direction (the X direction). The thickness may be an average of ten values measured at arbitrary points of the first base electrode 131a and the second base electrode 132a on the first surface S1 and the second surface S2 of the ceramic body 110. Since the thickness of the first base electrode 131a and the second base electrode 132a satisfy the above-range, it is possible to effectively suppress the permeation of external moisture, or the like, while having excellent electrical characteristics.

In an embodiment of the present disclosure, the first and second conductive layers 131b and 132b may be disposed to cover the first base electrode 131a and the second base electrode 132a. In the present specification, the conductive layers 131b and 132b are disposed to cover the base electrodes 131a and 132a, which may mean that the conductive layers 131b and 132b are disposed such that the base electrodes 131a and 132a are not exposed externally. As such, when the conductive layer is disposed to cover the base electrode, the moisture resistance reliability of the multilayer ceramic electronic component according to the present disclosure may be improved.

In an embodiment of the present disclosure, the first and second conductive layers 131b and 132b disposed on the first base electrode 131a and the second base electrode 132a may be conductive resin layers. The conductive resin layer may include a conductive metal and a base resin. The conductive resin layer may be formed using a conductive paste for external electrodes including metal particles and a base resin.

The conductive resin layer may include a conductive metal, and the conductive metal may be in a form of a powder particle. The shape of the conductive metal powder particle may be spherical or flake-shaped. The conductive metal powder particles may be disposed to be in contact with or adjacent to each other in the conductive resin layer, and the base resin may be disposed to surround the metal particles.

The conductive metal powder particle is not particularly limited as long as it is a particle of a metal having excellent conductivity, and may include, for example, copper (Cu), silver (Ag), nickel (Ni), and alloys thereof.

The base resin may be a thermosetting resin. The thermosetting resin may be an epoxy resin, but is not limited thereto.

The first and second conductive layers 131b and 132b disposed on the first base electrode 131a and the second base electrode 132a may be formed of a conductive resin layer, to protect the multilayer ceramic electronic component from external thermal, chemical, and physical impacts, and increase bending strength of the multilayer ceramic electronic component.

For example, the conductive resin layer may prevent moisture from being permeated into the ceramic body, and may prevent a plating solution from being permeated into the ceramic body when the plating layer is formed. Thereby, it is possible to improve the moisture resistance reliability of the multilayer ceramic electronic component according to the present disclosure.

In one example, a thickness of a first conductive layer 131b and a second conductive layer 132b may be in a range of 3 μm to 13 μm. The thickness of the first conductive layer 131b and the second conductive layer 132b may refer to a length of the first conductive layer 131b and the second conductive layer 132b in a first direction (the X direction). The thickness may be an average of ten values measured at arbitrary points of the first conductive layer 131b and the second conductive layer 132b on the first surface S1 and the second surface S2 of the ceramic body 110. Since the thicknesses of the first conductive layer 131b and the second conductive layer 132b satisfy the above ranges, permeation of external moisture, and the like can be effectively suppressed while having excellent electrical characteristics.

Figure 4:
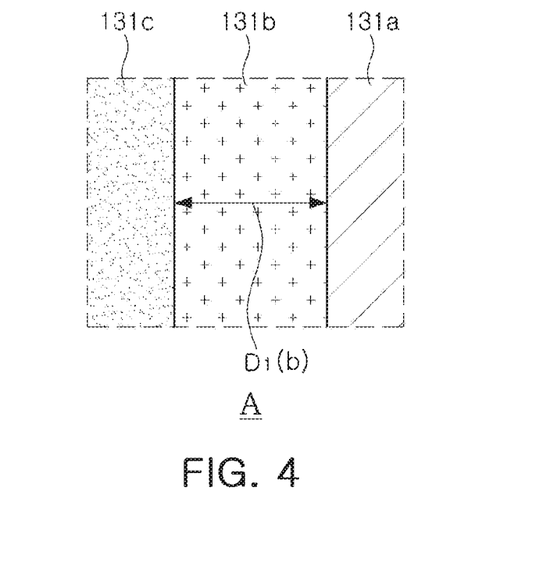
FIG. 4 is an enlarged view of region A of FIG. 3.
Figure 5:
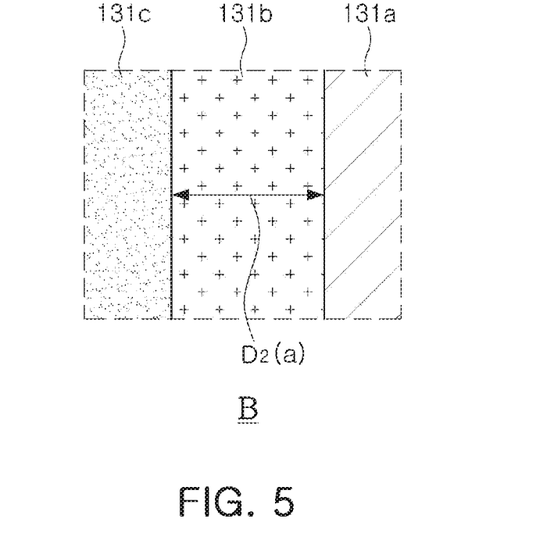
FIG. 5 is an enlarged view of region B of FIG. 3.

In an embodiment of the present disclosure, a thickness of the first conductive layer 131b and the second conductive layer 132b measured in the central portion of the first surface S1 and the second surface S2 of the ceramic body 110 is 'a' and a thickness of the first conductive layer 131b and the second conductive layer 132b measured at the end of the capacitance formation portion is 'b', 'b/a' may exceed 0.07. Referring to FIGS. 3 to 5, the thickness 'a' of the first conductive layer 131b and the second conductive layer 132b measured in the central portion of the first surface S1 and the second surface S2 of the ceramic body 110 may mean a length ($D_2(a)$) of the first conductive layer 131b and the second conductive layer 132b in a first direction (the X direction) in the central portion (exemplary embodiment shown at center line C) of the first surface S1 and the second surface S2 of the ceramic body 110, as shown in FIGS. 3 and 5. In addition, the thickness 'b' of the first conductive layer 131b and the second conductive layer 132b measured at the end of the capacitance formation portion may refer to a length ($D_1(b)$) of the first conductive layer 131b and the second conductive layer 132b in a first direction (the X direction) in the central portion of the first surface S1 and the second surface S2 of the ceramic body 110, as shown in FIGS. 3 and 5.

The central portion of the first surface S1 and the second surface S2 of the ceramic body 110 may refer to a point in which two lines connecting opposite edges of the first surface S1 of the ceramic body 110 meet and a point in which two lines connecting opposite edges of the second surface S2 thereof meet. In addition, an end of the capacitance formation portion may refer to a position of an internal electrode disposed at an outermost portion of the first and second internal electrodes 121 and 122 in a third direction (the Z direction), and may refer to a boundary between the internal electrode and the margin portion 112 of the ceramic body 110 in the second direction (the Y direction). When the ratio (b/a) satisfies the above-described range, an excellent corner coverage performance may be realized, and moisture resistance reliability may be improved.

In an embodiment of the present disclosure, a first terminal electrode 131c and a second terminal electrode 132c may be disposed on the first conductive layer 131b and the second conductive layer 132b of the multilayer ceramic electronic component, respectively. The first terminal electrode 131c and the second terminal electrode 132c may be disposed to cover the first conductive layer 131b and the second conductive layer 132b, respectively. In the present specification, terminal electrodes 131c and 132c are disposed to cover conductive layers 131b and 132b, which may mean that the terminal electrodes 131c and 132c are disposed such that the conductive layers 131b and 132b are exposed externally, and it may mean a structure in which only the first terminal electrode 131c and the second terminal electrode 132c are shown when the first conductive layer 131b and the second conductive layer 132b are disposed, respectively, in the first external electrode 131 and the second external electrode 132, when viewed from the outside.

In an embodiment of the present disclosure, first and second terminal electrodes 131c and 132c may be formed by plating. The first and second terminal electrodes 131c and 132c may be formed by sputtering or electric deposition, but are not limited thereto.

The first and second terminal electrodes 131c and 132c may contain the most nickel (Ni), but are not limited thereto, and may include nickel (Ni), copper (Cu), tin (Sn), palladium (Pd), platinum (Pt), gold (Au), silver (Ag), tungsten (W), titanium (Ti) or lead (Pb) and the like, or alloys thereof. The first and second terminal electrodes 131c and 132c may be included to improve mountability, structural reliability, external durability, heat resistance, and/or equivalent series resistance (ESR) with a substrate.

In an example, a thickness of the first terminal electrode 131c and the second terminal electrode 132c may be in a range of 3 μm to 13 μm. The thickness of the first terminal electrode 131c and the second terminal electrode 132c may mean a length of the first terminal electrode 131c and the second terminal electrode 132c in a first direction (the X direction). The thickness may be an average of ten values measured at arbitrary points of the first terminal electrode 131c and the second terminal electrode 132c on the first and second surfaces S1 and S2 of the ceramic body 110. Since the thickness of the first terminal electrode 131c and the second terminal electrode 132c satisfy the above range, permeation of external moisture, or the like, may be effectively suppressed while having excellent electrical characteristics.

In an embodiment of the present disclosure, a plating layer P may be additionally disposed on the first terminal electrode 131c and the second terminal electrode 132c, respectively. The plating layer P may contain tin. When the first terminal electrode 131c and the second terminal electrode 132c contain nickel, there is a problem that an oxide layer is formed on a surface of nickel during the firing process, such that it is difficult to form a plating layer. In addition, there is a problem that the formed plating layer may be easily peeled off. In the multilayer ceramic electronic component according to the present embodiment, a uniform plating layer may be formed by disposing a plating layer containing tin having excellent plating characteristics on the first terminal electrode 131c and the second terminal electrode 132c containing nickel.

According to an embodiment of the present disclosure, if a total length of a multilayer ceramic electronic component 100 in the first direction is less than 3.2 mm, a ratio (b/a) of the thickness 'a' of the first conductive layer 131b and the second conductive layer 132b measured in the central portion of the first surface S1 and the second surface S2 of the ceramic body 110 and the thickness 'b' of the first conductive layer 131b and the second conductive layer 132b measured at the end of the capacitance formation portion may be more than 0.2 but less than 1. When the ratio (b/a) is 0.2 or less, moisture resistance reliability may be lowered, and forming the first conductive layer 131b and the second conductive layer 132b to exceed 1 may have a smaller gain that can be substantially obtained in comparison with an excessive increase in cost.

According to another embodiment of the present disclosure, if a total length of a multilayer ceramic electronic component 100 in the first direction is 3.2 mm or more, and a ratio (b/a) of the thickness 'a' of the first conductive layer 131b and the second conductive layer 132b measured in the central portion of the first surface S1 and the second surface S2 of the ceramic body 110 and the thickness 'b' of the first conductive layer 131b and the second conductive layer 132b measured at the end of the capacitance formation portion may be more than 0.07 but less than 1. When the ratio (b/a) is 0.07 or less, moisture resistance reliability may be lowered, and forming the first conductive layer 131b and the second conductive layer 132b to exceed 1 may have a smaller gain that can be substantially obtained may be substantially obtained in comparison with an excessive increase in cost.

Table 1 below shows results of a reliability test for moisture resistance with respect to a ratio (b/a) of the thickness 'a' of the first conductive layer 131b and the second conductive layer 132b measured in the central portion of the first surface S1 and the second surface S2 of the ceramic body 110 and the thickness 'b' of the first conductive layer 131b and the second conductive layer 132b measured at the end of the capacitance formation portion when the length of the multilayer ceramic electronic component is less than 3.2 mm.

Defects of the reliability for moisture resistance was investigated when a voltage of 2 Vr was applied for 48 hours at a temperature of 85° C. and a relative humidity of 85%, and the number of the multilayer ceramic electronic components in which defects occurred in 400 samples was investigated.

TABLE 1

| | Results of moisture resistance reliability | | |
|---|---|---|---|
| b/a | 1608 (length: 1.6 mm, width: 0.8 mm) | 2012 (length: 2.0 mm, width 1.25 mm) | |
| Less than 0.1 | 3/400 | 2/400 | Increase in Defects |
| 0.1 or more~less than 0.2 | 1/400 | 0/400 | Increase in Defects |

TABLE 1-continued

| | Results of moisture resistance reliability | | |
|---|---|---|---|
| b/a | 1608 (length: 1.6 mm, width: 0.8 mm) | 2012 (length: 2.0 mm, width 1.25 mm) | |
| 0.2 or more~less than 0.3 | 0/400 | 0/400 | OK |
| 0.3 or more | 0/400 | 0/400 | OK |

As shown in Table 1, when a ratio (b/a) of the thickness 'a' of the first conductive layer 131b and the second conductive layer 132b measured in a central portion of the first conductive layer 131b and the second conductive layer 132b and the thickness 'b' of the first conductive layer 131b and the second conductive layer 132b measured at an end of the capacitance formation portion is less than 0.2, it may be confirmed that the frequency of occurrence of defects increases. Therefore, when the ratio (b/a) is 0.2 or more, it can be confirmed that it has excellent moisture resistance reliability.

Table 2 shows that results of a reliability test for moisture resistance with respect to a ratio (b/a) of the thickness 'a' of the first conductive layer 131b and the second conductive layer 132b measured in the central portion of the first surface S1 and the second surface S2 of the ceramic body 110 and the thickness 'b' of the first conductive layer 131b and the second conductive layer 132b measured at the end of the capacitance formation portion when the length of the multilayer ceramic electronic component is 3.2 mm or more.

TABLE 2

| | Results of moisture resistance reliability | | |
|---|---|---|---|
| b/a | 3216 (length: 3.2 mm, width: 1.6 mm) | 3225 (length: 3.2 mm, width 2.5 mm) | |
| Less than 0.05 | 1/400 | 3/400 | Increase in Defects |
| 0.05 or more~less than 0.07 | 1/400 | 2/400 | Increase in Defects |
| 0.07 or more~less than 0.1 | 0/400 | 0/400 | OK |
| 0.1 or more | 0/400 | 0/400 | OK |

As shown in Table 2, when a ratio (b/a) of the thickness 'a' of the first conductive layer 131b and the second conducive layer 132b measured in a central portion of the first surface S1 and the second surface S2 of the ceramic body 110 and the thickness 'b' of the first conductive layer 131b and the second conductive layer 132b measured at an end of the capacitance formation portion is less than 0.07, it can be confirmed that a defect occurrence frequency increases. Therefore, when the ratio (b/a) is 0.07 or more, it may be confirmed that it has excellent moisture resistance reliability.

As set forth above, according to an embodiment of the present disclosure, a multilayer ceramic electronic component capable of improving a corner coverage of an external electrode may be provided.

According to another embodiment of the present disclosure, a multilayer ceramic electronic component having improved moisture resistance reliability may be provided.

However, various and advantageous advantages and effects of the present disclosure are not limited to the above description, and will be more readily understood in the course of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
a ceramic body including a capacitance formation portion including a dielectric layer and first and second internal electrodes stacked in a stacking direction with the dielectric layer interposed therebetween, and including a first surface and a second surface opposing to each other in a first direction, a third surface and a fourth surface opposing to each other in a second direction, and a fifth surface and a sixth surface opposing to each other in a third direction which is the stacking direction; and
first and second external electrodes disposed on the first and second surfaces of the ceramic body, respectively, and including first and second base electrodes connected to the first and second internal electrodes and first and second conductive layers disposed to cover the first and second base electrodes, respectively,
wherein a ratio 'b/a' is more than 0.2 but less than 1, where a thickness of the first and second conductive layers in a respective central portion of the first and second surfaces of the ceramic body is 'a', and a thickness of the first and second conductive layers at a respective end of the capacitance formation portion is 'b',
wherein a total length of the multilayer ceramic electronic component in the first direction is less than 3.2 mm and equal to or greater than 1.6 mm, and
wherein entire portions of the first and second base electrodes respectively disposed on the first and second surfaces have a thickness in a range of 3 μm to 13 μm, and entire portions of the first and second conductive layers respectively disposed on the first and second surfaces have a thickness in a range of 3 μm to 13 μm.

2. The multilayer ceramic electronic component of claim 1, further comprising a margin portion disposed on each of the third and fourth surfaces of the capacitance formation portion in the second direction; and
a cover portion disposed on each of the fifth and sixth surfaces of the capacitance formation portion in the third direction.

3. The multilayer ceramic electronic component of claim 2, wherein at least one of the cover portions includes one or more dielectric layers.

4. The multilayer ceramic electronic component of claim 1, wherein the first and second base electrodes contain copper.

5. The multilayer ceramic electronic component of claim 1, wherein the first and second conductive layers comprise a conductive metal and a base resin.

6. The multilayer ceramic electronic component of claim 1, wherein first and second terminal electrodes are additionally disposed on the first and second conductive layers, respectively.

7. The multilayer ceramic electronic component of claim 6, wherein the first and second terminal electrodes have an average thickness in a range of 3 μm to 13 μm.

8. The multilayer ceramic electronic component of claim 6, wherein the first and second terminal electrodes contain nickel.

9. The multilayer ceramic electronic component of claim 6, wherein a plating layer is additionally disposed on each of the first and second terminal electrodes.

10. The multilayer ceramic electronic component of claim 9, wherein the plating layer contains tin.

11. A multilayer ceramic electronic component, comprising:
a ceramic body including a capacitance formation portion including a dielectric layer and first and second internal electrodes stacked in a stacking direction with the dielectric layer interposed therebetween, and including a first surface and a second surface opposing to each other in a first direction, a third surface and a fourth surface opposing to each other in a second direction, and a fifth surface and a sixth surface opposing to each other in a third direction which is the stacking direction; and
first and second external electrodes disposed on the first and second surfaces of the ceramic body, respectively, and including first and second base electrodes connected to the first and second internal electrodes and first and second conductive layers disposed to cover and being in direct physical contact with the first and second base electrodes, respectively,
wherein a ratio 'b/a' is more than 0.07 but less than 1, where a thickness of the first and second conductive layers in a respective central portion of the first and second surfaces of the ceramic body is 'a', and a thickness of the first and second conductive layers at a respective end of the capacitance formation portion is 'b',
wherein a total length of the multilayer ceramic electronic component in the first direction is 3.2 mm or more, and
wherein entire portions of the first and second base electrodes respectively disposed on the first and second surfaces have a thickness in a range of 3 μm to 13 μm, and entire portions of the first and second conductive layers respectively disposed on the first and second surfaces have a thickness in a range of 3 μm to 13 μm.

12. The multilayer ceramic electronic component of claim 11, further comprising a margin portion disposed on each of the third and fourth surfaces of the capacitance formation portion in the second direction; and
a cover portion disposed on each of the fifth and sixth surfaces of the capacitance formation portion in the third direction.

13. The multilayer ceramic electronic component of claim 12, wherein at least one of the cover portions includes one or more dielectric layers.

14. The multilayer ceramic electronic component of claim 11, wherein the first and second base electrodes contain copper.

15. The multilayer ceramic electronic component of claim 11, wherein the first and second conductive layers comprise a conductive metal and a base resin.

16. The multilayer ceramic electronic component of claim 11, wherein first and second terminal electrodes are additionally disposed on the first and second conductive layers, respectively.

17. The multilayer ceramic electronic component of claim 16, wherein the first and second terminal electrodes have an average thickness in a range of 3 μm to 13 μm.

18. The multilayer ceramic electronic component of claim 16, wherein the first and second terminal electrodes contain nickel.

19. The multilayer ceramic electronic component of claim 16, wherein a plating layer is additionally disposed on each of the first and second terminal electrodes.

20. The multilayer ceramic electronic component of claim 19, wherein the plating layer contains tin.

* * * * *